INVENTOR
CARL MAURITZ CHRISTIANSSON
BY
ATTORNEYS 3,337,207
SPRING DEVICE
Carl Mauritz Christiansson, Bofors, Sweden, assignor to Aktiebolaget Bofors, Bofors, Sweden, a Swedish corporation
Filed Apr. 6, 1965, Ser. No. 446,047
Claims priority, application Sweden, Apr. 8, 1964, 4,361/64
3 Claims. (Cl. 267—1)

This invention relates to a spring device comprising an elongated plate or leaf spring mounted along one of its longitudinal sides to a support and having the general shape of an elongated bar.

It is an object of the invention to provide an elongated spring bar having substantially the same elastic action, or deflection, in response to a downwardly directed force applied to the bar at the free edge thereof protruding outwardly from the support therefor, irrespective whether the force is applied adjacent the ends of the bar or centrally, and in which the free edge of the bar, when subjected to such force obtains a deflection which is substantially the same at all parts of the bar in the longitudinal direction thereof even if the bar is subjected to an eccentric load, for instance, a point load at one end of the bar, in spite of the torsional moment to which the bar is subjected by such eccentric load.

A spring bar consisting of a single springy leaf attached to a support at one of its longitudinal edges and, although having a restricted length, being considerably longer than wide between the edge thereof attached to the support and the edge facing outwardly from the support, will exhibit a spring characteristic which varies between wide limits depending upon whether the load is applied adjacent one of the ends of the spring bar or near the center thereof. Obviously, the deflection of the bar for a particular load will also vary to the same extent, the free longitudinal edge of the bar thus obtaining a warped position relative to the edge attached to the support, particularly if the load is applied asymmetrically in reference to the mid-point of the bar. Such non-uniform deflection of the spring and the varying spring characteristic as related along the longitudinal direction of the spring entail considerable disadvantages in many applications of a bar spring element of the kind described.

The present invention provides a spring device, the elastic components of which constitute a bar secured to a support along one longitudinal edge of the bar, in which said disadvantages are eliminated, or at least reduced.

For this purpose a spring device, according to the invention, comprises at least two bar-shaped leaf springs which are rigidly attached to a support member at a predetermined mutual distance so as to extend from the support member in mutually substantially parallel planes, the two remaining, mutually parallel edges of said leaf springs being interconnected by means of a connecting member attached to said last mentioned edges to hold the leaf springs at said predetermined mutual distance.

When exposed to a force applied so as to cause a moment about an axis parallel to the longitudinal direction of the spring device and causing a deflection thereof, the free face of the device opposite to the face thereof attached to the support will be subjected to a substantially translatory motion irrespective of the location of the point of attack of the force in the longitudinal direction of the spring due to the comparatively high torsional resistance moment of the structure.

Thus, the tubular bar comprising the elastic portions of the spring device will be deformed to a substantially lesser extent by the torsional force originating from the force applied to the free edge of the bar, as compared with the deformation of a bar consisting of a single leaf spring having substantially corresponding spring characteristics (which however, for such a single leaf spring of a limited length would vary considerably along the length of the spring length). These features of the spring are specifically pronounced for a force applied adjacent to an end of the spring in the longitudinal direction thereof.

The invention will become more clearly apparent from the following description of a preferred embodiment thereof illustrated on the accompanying drawing, in which.

Figure 1:
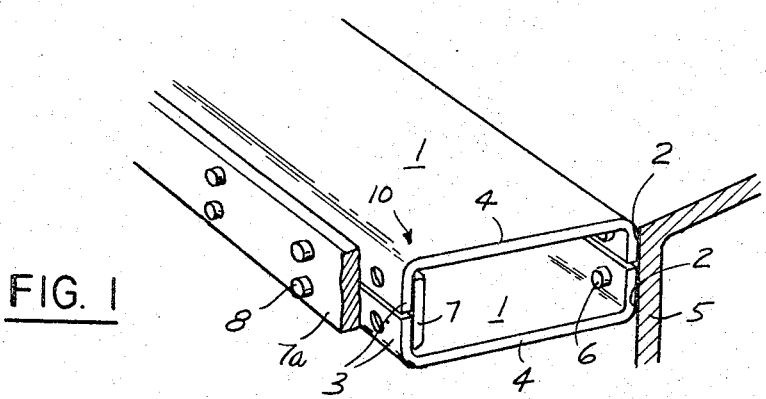
FIG. 1 shows a perspective view of one of the end portions of a spring device according to the invention comprising two U-shaped bars butt connected to each other along the branches of the U-shaped bars.
Figure 2:
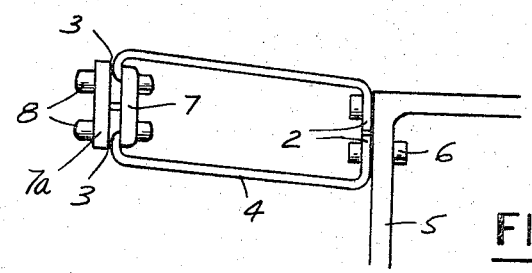
FIG. 2 shows the same spring device as seen in the axial direction thereof.

In the embodiment illustrated in FIGS. 1 and 2, the spring device comprises two U-shaped bars 1 made from springy plate material, said bars being butt mounted along the edges of branches 2 and 3 of the bars facing each other. The webs 4 of the bars constitute, in conjunction with the curved corner portions at which branches 2 and 3 merge into web 4, the springy components producing the spring action of the device.

The spring device may have any desired length, depending upon the particular application for which the device is to be used.

The bar branches 2 are attached to a suitable support such as a wall 5 by fastening means 6 suitable for the purpose and branches 3 are joined by means of strips 7 and 7a mounted on opposite sides of the branches and secured thereto by fastening means 8. The springy bars 1 are attached to each other so that the webs 4 thereof, which are of equal length, extend parallel to each other.

When the spring device is actuated by a force 10 directed towards the free edge thereof, the spring device will be deflected while moving generally in the manner of an elastic parallel linkage as seen in a section perpendicular to the longitudinal direction of the spring device. In response to a force applied as the one illustrated by arrow 10 adjacent to one end of the spring device, the same, due to its tubular or box-like shape, has a comparatively high strength against the torsional moment to which the spring device is exposed.

Figure 3:
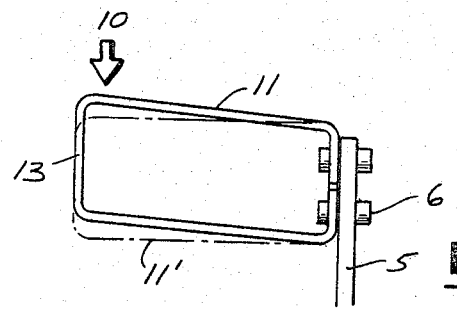
FIG. 3 shows a modification of the device comprising a spring means manufactured of one piece of spring sheet metal.

A further embodiment according to the invention is illustrated in FIG. 3. In this embodiment, the spring device comprises a plate 11 which is bent to a rectangular cross section, or is in the form of a rectangular tube. The free side wall 13 of the spring device according to FIG. 3 will also move substantially parallel to itself when deflected by a force indicated by arrow 10, the deflected shape of the device being illustrated in dashed lines 11'.

As mentioned above, the spring device according to the invention is applicable in any structure, in which it is desirable to provide an elongated spring member attached to a spring support along one of its longitudinal faces and having substantially the same spring constant for loads or forces applied to the spring device at whatever part of the free edge thereof in the longitudinal direction of the device.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims. For instance, the substantially parallel side walls of the spring bar may each be corrugated, the ridges and grooves of the corrugations extended in the longitudinal direction of the spring device.

What is claimed is:

1. A spring device comprising two complementary bars of generally U-shaped cross-section and made of springy material, the lengthwise edges of the branches of the bars facing each other to define therebetween a hollow elongate body of generally rectangular cross-section and open at both ends, first fastening means secured to the respective branch of each of the bars on one of the long side walls of said body for mounting said body on a support wall parallel to the plane thereof, and second fastening means securing together the branches defining the opposite long side wall of said body, whereby the device will have substantially the same spring constant at whatever point along the length thereof a load may be applied.

2. A spring device according to claim 1 wherein said second fastening means comprises at least one strip substantially co-extensive with the two respective branches and bridging the same.

3. A spring device comprising an elongate hollow body of substantially rectangular cross-section and open at both ends, said body being made of springy sheet material and slotted along one of its long side walls intermediate the top and bottom wall of the body, and fastening means on said slotted long side wall for securing said body to a support wall parallel to the plane thereof, whereby the device will have substantially the same spring constant at whatever point along the length thereof a load may be applied.

References Cited

UNITED STATES PATENTS

| | | | |
|---|---|---|---|
| 2,910,033 | 10/1959 | Weisburg | 114—219 |
| 2,989,063 | 6/1961 | Clark | 267—1 |
| 3,140,113 | 7/1964 | Williams | 267—1 |

FOREIGN PATENTS 958,792  2/1957  Germany.

ARTHUR L. LA POINT, *Primary Examiner.*

R. M. WOHLFARTH, *Assistant Examiner.*